Feb. 23, 1960  R. S. HAMPTON ET AL  2,925,934
SUPPORT MEANS FOR THE MOVABLE END OF A VESSEL
Filed Nov. 26, 1957
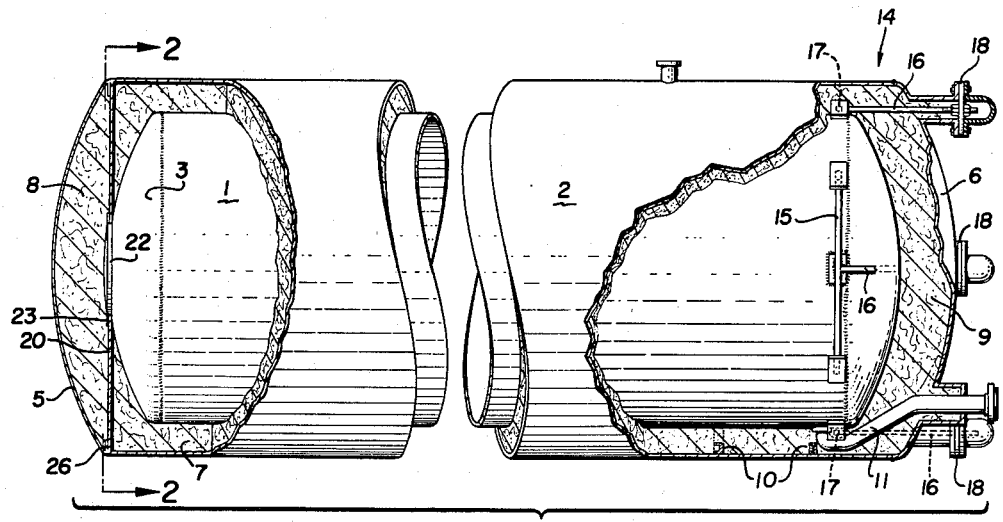
Fig. 1
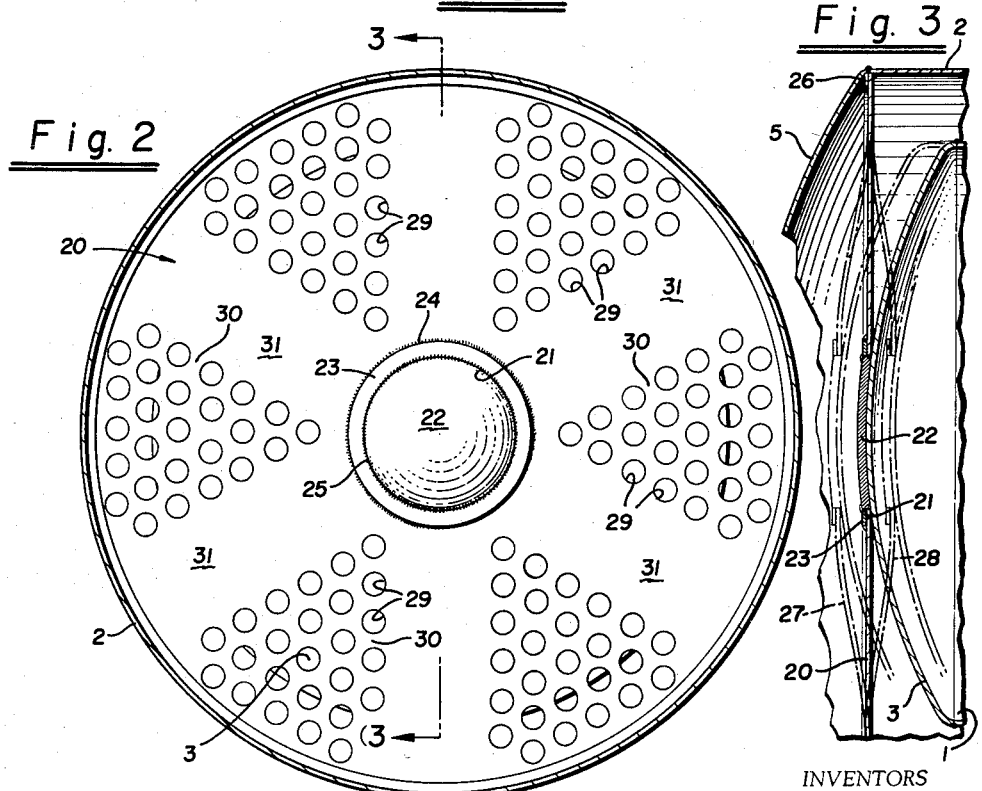
Fig. 2
Fig. 3
INVENTORS
Robert S. Hampton
William Josephian
BY
Attorneys United States Patent Office 2,925,934
Patented Feb. 23, 1960

2,925,934

SUPPORT MEANS FOR THE MOVABLE END OF A VESSEL

Robert S. Hampton, Orinda, and William Josephian, Oakland, Calif., assignors to Lox Equipment Co., Oakland, Calif., a corporation of California Application November 26, 1957, Serial No. 698,999

5 Claims. (Cl. 220—15)

This invention relates to vessel support means, and more particularly, to a support for the movable end of an inner vessel enclosed in an outer jacket.

Jacketed vessels of the type herein described are used generally for storing and transporting liquified gases, such as oxygen, at low temperatures. Because it is necessary to maintain most liquified gases at a low temperature the vessel containing the liquid is commonly enclosed in an outer jacket with an insulating space provided between the inner vessel and such jacket. Cylindrical vessels are commonly used in this type of service. Such vessels may be for use at atmospheric pressure, at positive pressures, and occasionally at below atmospheric pressure.

It is desirable that the insulating space between the inner and outer tanks be substantially equal on all sides of the inner tank, and some means must be provided for supporting said inner tank in such a position. Heretofore, various types of saddle supports, tension rods, straps or cable supports have been used to support the inner vessel from the outer jacket or shell.

Because of the wide temperature variation that must be permitted between an empty tank, at atmospheric temperature, and a filled tank, at the low temperature of the liquified gas, provision must be made for expansion and contraction of the inner tank. Prior known structures have usually made such provision by means of supports which slide, rock or roll on the supporting surface of the outer jacket.

These methods are subject to friction and wear, particularly in portable tank units, such as those hauled on trailers and the like. It has also been found that the supporting structures which rely on a sliding or rolling movement for permitting dimensional changes in the tank must be considerably stronger than is necessary to merely support the tank load because of the stresses set up by the resistance to such movement, and the impact due to play in the bearings of movable end supports.

It is therefore an object of this invention to provide a relatively simple support for the end of a tank subject to limited movement, which support eliminates frictional resistance to such movement and play due to clearances.

Another object of this invention is the provision of a support for the end of a jacketed vessel subject to dimensional changes, which support requires only a minimum of material sufficient to provide the desired strength in vertical and transverse directions while maintaining substantial resistance to heat conduction to the inner vessel.

It is still another object of this invention to provide support for the end of an inner tank enclosed in an outer tank in which said inner tank is subject to temperature elongation and shrinking and which support means also spreads the load so stress concentrations are minimized.

Yet another object of this invention is the provision of a support for the end of a horizontal, cylindrical tank during movement of said tank under variable temperature conditions, which support is rigidly connected to both said tank and to the base on which said support rests.

A further object of this invention is the provision of structural supporting means for an inner tank containing a low temperature liquid enclosed in vacuum insulating jacket, which support permits only a limited amount of heat leak between said jacket and said tank.

Also it is an object of this invention to provide necessary support within the normal bounds of the closed cylindrical vacuum jacket, with no extra welded seams subject to possible leakage to spoil the vacuum.

Other objects and advantages will become apparent from the following description taken in connection with the accompanying drawing, in which:

Fig. 1 is a side elevational view of a jacketed vessel, partly broken away to show the support means of this invention;

Fig. 2 is an enlarged cross-sectional view taken substantially along line 2—2 of Fig. 1; and, Fig. 3 is a longitudinal sectional view as seen from line 3—3 of Fig. 2, showing alternate positions of movement of the tank end in dot-dash lines.

In detail, referring to Fig. 1, the support means of this invention is designed for use with a pair of horizontal, generally cylindrical vessels 1, 2. Both of these vessels are formed from sheet metal and are provided with domed or convex ends 3, 4 and 5, 6, respectively. Vessel or cylinder 1 is the smaller of the two and acts as a liquid-carrying vessel. The larger vessel 2 acts as an enclosure or jacket surrounding cylinder 1 and providing annular insulating space 7 and end spaces 8, 9 therebetween.

It will be understood that the support of this invention is not necessarily restricted in use to the particular vessel described. However, cylindrical vessels with convex ends are illustrated herein as being the most practical for use in the situation described because of their superior strength characteristics and ease of fabrication. The combination of vessel 1 and jacket 2 provides an efficient container for storing and transporting liquified gases, such as oxygen, nitrogen, hydrogen and the like. These gases in a liquified state are extremely cold. For example, liquid oxygen is maintained at a temperature of approximately —297° F. at a pressure of 14.7 pounds per square inch, absolute, in tank 1.

Tank 1 is supported centrally of tank 2 so as to provide substantially equal spacing between said tanks. These spaces 7, 8, 9 are, in practice, filled with a suitable insulating material (usually powder), as shown, and may be evacuated to very low pressures. The purpose of the spaces 7, 8, 9, the evacuation, and the insulation is to reduce the heat transfer from the surroundings into the inner vessel to a practical minimum. For example, without evacuation, oxygen containers will usually vary from 1 to 5% evaporation per 24 hour day, and with evacuation, from one-tenth to five-tenths of one percent per day. Especially in the larger sizes of jacketed vessels of this type, stiffening ribs 10 (Fig. 1) may be added to strengthen jacket 2. Piping 11 is provided communicating between inner tank and the exterior of jacket 2 for the purpose of filling and emptying tank 1 of its liquid contents for venting gases, and for instrumentation.

One end 4 of the inner tank 1 is substanitally fixed with relation to outer tank 2. The other end 3 is, by the means of this invention, permitted limited movement axially of the tank in response to dimensional changes of tank 1 caused by variable temperature conditions.

Fixed end 4 of tank 1 may be supported by any suitable supporting means, generally designated 14 (Fig. 1). Said support means may include a pair of vertical braces or struts 15 and a pair of horizontal struts 17 which are welded to the shell of vessel 1 and extend tangentially therefrom across space 7 to outer jacket 2. Longitudinal side braces 16 are welded at one end to the side of tank 1 and extend through the head 6 of outer jacket 2 where both braces are welded to a plate 18 which is rigidly secured to head 6 of outer jacket 2. Braces 15, 16 and 17 may be angle bars, T-bars, straps, or rods or any suitable member having sufficient strength to support the weight load of vessel 1 as well as axial loads caused by acceleration in transit and the like. All the connections between braces 15, 16, 17 and tanks 1 and 2 are preferably rigidly secured as by welding so as to prevent movement between end 4 of vessel 1 and the outer jacket 2.

The expansion and contraction of the length of tank 1 which occurs as said tank is subjected to various temperatures from atmospheric to the low liquid temperatures therefore cause end 3 of said vessel to move axially toward and away from end 4. Movable end 3 of vessel 1 is supported by the movable support means, generally designated 20, of this invention which comprises a generally planar plate member. Member 20 is preferably formed of a relatively thin sheet material of low thermal conductivity and high strength and good low temperature properties such as 18–8 stainless steel. Plate member 20 extends transversely of vessels 1 and 2 across the annular insulating space 7 and is rigidly secured at its central portion to end 3 of vessel 1 and at its outer periphery to jacket 2.

Preferably, plate member 20 is circular in shape and is provided with a central aperture 21 (Fig. 2) which receives therein a circular reinforcing disk 22 rigidly carried by end 3 of vessel 1. A reinforcing ring 23 may be provided surrounding aperture 21 and said ring is welded to plate member 20 as at 24, similar to the continuous weld 25 between the edge of aperture 21 and ring 24 and disk 22. In this manner, the outermost portion of convex end 3 of tank 1 is received in aperture 21 and is rigidly secured to plate member 20.

The outer periphery of plate member 20 is preferably continuously welded to the inner wall of tank 2 adjacent head 5. A reinforcing ring 26 may be welded to plate 20 and jacket 2 adjacent said outer periphery to strengthen the joint.

Plate member 20 is sufficiently flexible so that it may be deformed axially of tank 1 by the expansion and contraction of said vessel. In effect, member 20 may become bowed or disked in either of two alternate positions 27, 28, upon expansion or contraction, respectively of vessel 1 under temperature change. Preferably, plate member 20 is assembled with the vessels so as to be maintained in a substantially flat, planar position when vessel 1 is at the temperature of the liquified gas contained therein. In this flat position member 20 is obviously at its greatest strength in supporting the vertical weight load of inner vessel 1 on outer vessel 2.

In construction at atmospheric temperature, plate number 20 is bowed outwardly of head 3 and the remaining jacketed vessel structure completely assembled and tested. When inner vessel 1 is filled with a liquified gas, such as oxygen, the lowered temperature thereof shrinks said vessel thereby causing plate member 20 to be drawn to and maintained at the planar position shown in Fig. 1 and in solid lines in Fig. 3.

As well as permitting movement of end 3 of vessel 1 in response to temperature changes without incurring frictional resistance or wear, plate number 20 provides substantial structural support for outer vessel 2. Member 20, even though relatively thin and flexible in an axial or transverse direction, is very strong in a vertical or radial direction, and therefore assists in maintaining tank 2 cylindrical while adequately supporting end 3 of tank 1 centrally thereof. The movable end support of this invention is also relatively easily fabricated from a minimum of material and is readily assembled with the jacketed vessel.

In order to minimize the heat conduction from the outer, warmer jacket to the inner, colder vessel, a plurality of holes or perforations 29 are punched in the diaphragm member 20 in pie shaped sections or areas 30 leaving a number of areas or bands 31 free of such holes, such that the cross sectional area of these bands 31 are adequate to carry the full load when ignoring the remaining strength in the punched sections 30. The punched section is nevertheless left with adequate metal to maintain the outer jacket in a substantially round shape when a weight load is applied and when the diaphragm member 20 itself shrinks from temperature drop. Thus excessive distortion and stress concentrations in the outer jacket under load are prevented.

Although this invention has been described and illustrated in detail, it should be understood that modifications that would occur to one skilled in the art are intended to be included in the spirit and scope of the appended claims.

We claim:

1. In combination, a pair of horizontal, generally cylindrical vessels each provided with opposed convex ends and including an inner vessel subject to temperature elongation and shrinking and a relatively larger outer vessel enclosing said inner vessel and providing an annular insulating space and end spaces therebetween, means rigidly connecting one end of said inner vessel to said outer vessel, a relatively flexible, flat, generally circular plate member, having its central portion rigidly secured centrally of the other convex end of said inner vessel, extending substantially normal to the longitudinal axes of said vessels, and having its outer peripheral edge rigidly secured to the wall of said outer vessel adjacent the end thereof.

2. In combination, a pair of horizontal, generally cylindrical vessels each provided with opposed convex ends and including an inner vessel subject to temperature elongation and shrinking and a relatively larger outer vessel enclosing said inner vessel and providing an annular insulating space and end spaces therebetween, means rigidly connecting one end of said inner vessel to said outer vessel, a relatively flexible, flat, circular plate member, having its central portion rigidly secured centrally of the other convex end of said inner vessel, extending normal to the longitudinal axes of said vessels, and having its outer peripheral edge rigidly secured to the wall of said outer vessel adjacent the end thereof, said plate member having a plurality of perforations therethrough established in a pattern providing perforated areas alternating with solid areas extending radially outwardly from said central portion to said peripheral edge.

3. In combination, a pair of horizontal, generally cylindrical vessels each provided with opposed convex ends and including an inner vessel subject to temperature elongation and shrinking and a relatively larger outer vessel enclosing said inner vessel and providing an annular insulating space and end spaces therebetween, means rigidly connecting one end of said inner vessel to said outer vessel, a relatively flexible, flat, circular plate member, having its central portion rigidly secured centrally of the other convex end of said inner vessel, extending normal to the longitudinal axes of said vessels, and having its outer peripheral edge rigidly secured to the wall of said outer vessel adjacent the end thereof, said plate member being provided with a central aperture receiving the outermost portion of said other convex end and being secured thereto along the periphery of said aperture.

4. In combination with a horizontally extending jacketed vessel in which an inner vessel subject to dimensional changes is enclosed in an outer jacket providing an insulating space therebetween and one end of said vessel is rigidly secured to said jacket, means supporting the other end of said vessel comprising: a relatively thin, planar member having a periphery corresponding to the cross sectional shape of said jacket and centrally rigidly secured to said other end of said vessel, extending radially therefrom across said space, and peripherally rigidly secured to said jacket, whereby said member will flex in the direction of endwise movement of said other end of said vessel in accordance with such dimensional changes.

5. In combination with a horizontally extending jacketed vessel in which an inner vessel subject to dimensional changes is enclosed in an outer jacket providing an insulating space therebetween and one end of said vessel is rigidly secured to said jacket, means supporting the other end of said vessel for horizontal movement along a path toward and away from said one end in response to such dimensional changes, comprising: a planar member occupying a normal position centrally rigidly secured to said other end of said vessel, having a peripheral outer edge corresponding in shape to the cross section of said jacket, extending radially outwardly from said other end transversely of said path, and rigidly secured throughout said outer edge to said jacket, said member being sufficiently flexible to assume alternate dish-shaped positions on opposite sides of said normal position as said other end is moved by such dimensional changes.

References Cited in the file of this patent

UNITED STATES PATENTS

| | | |
|---|---|---|
| 645,626 | Mills | Mar. 20, 1900 |
| 1,607,071 | Gleason | Nov. 16, 1926 |

FOREIGN PATENTS

| | | |
|---|---|---|
| 720,875 | France | Dec. 12, 1931 |
| 1,126,947 | France | Aug. 6, 1956 |
| 770,132 | Great Britain | Mar. 13, 1957 |